US012715207B2

(12) United States Patent
Misra et al.

(10) Patent No.: US 12,715,207 B2
(45) Date of Patent: Aug. 25, 2026

(54) SYSTEM AND METHOD FOR DUAL STAGE CONTROL OF FIELD PRINTER ROBOT

(71) Applicant: Dusty Robotics, Inc., Mountain View, CA (US)

(72) Inventors: Sohum Misra, San Jose, CA (US); Ryan Michael Dimick, Redwood City, CA (US); William Charles Messner, Amesbury, MA (US); Philipp Josef Herget, Sunnyvale, CA (US)

(73) Assignee: Dusty Robotics, Inc., Mountain View, CA (US)

( * ) Notice: Subject to any disclaimer, the term of this patent is extended or adjusted under 35 U.S.C. 154(b) by 110 days.

(21) Appl. No.: 18/470,142

(22) Filed: Sep. 19, 2023

(65) Prior Publication Data

US 2024/0092077 A1 Mar. 21, 2024

Related U.S. Application Data

(60) Provisional application No. 63/407,978, filed on Sep. 19, 2022.

(51) Int. Cl.
*B25J 11/00* (2006.01)
*B41J 2/045* (2006.01)
(Continued)

(52) U.S. Cl.
CPC ....... *B41J 2/04505* (2013.01); *B41J 2/04586* (2013.01); *B41M 5/0047* (2013.01); *G05D 1/0231* (2013.01)

(58) Field of Classification Search
CPC ...... B41J 2/04505; B41J 2/04586; B41J 3/28; B41M 5/0047; G05D 1/0231;
(Continued)

(56) References Cited

U.S. PATENT DOCUMENTS 11,348,269 B1 * 5/2022 Ebrahimi Afrouzi ... G01S 17/48
2019/0240912 A1 8/2019 Alves
(Continued)

OTHER PUBLICATIONS

Bird, Bevan, "Analysis of Survey Point Displacements Using Total Station Measurements", Geomatics Engineering Department of British Columbia Institute of Technology, Apr. 24, 2009, 181 pgs.
(Continued)

*Primary Examiner* — Masud Ahmed
(74) *Attorney, Agent, or Firm* — Patent Law Works, LLP

(57) ABSTRACT

A controller design for a dual input single output (DISO) system is applied to a robot for printing layouts at construction sites. The differential drive robot has a separately controlled linear actuator that moves the print head perpendicularly to the fore-aft axis of the robot. The output is the lateral position of the print head; the sum of the position of the linear actuator (faster stage) relative to a reference point on the front of the robot, which is determined by the steering of the robot (slower stage). Both are measurable. The controller coordinates the action of the separately controlled linear actuator and the differential steering to achieve fast convergence and sub-millimeter tracking. Simulations and experimental results demonstrate the effectiveness of the approach.

19 Claims, 23 Drawing Sheets

(51) Int. Cl.
*B41M 5/00* (2006.01)
*G05D 1/00* (2006.01)

(58) Field of Classification Search
CPC .... G05D 1/247; G05D 1/646; G05D 2105/17; G05D 2107/90; G05D 2109/10; G05D 2111/17; B25H 7/04
See application file for complete search history.

(56) References Cited

U.S. PATENT DOCUMENTS

| | | | | |
|---|---|---|---|---|
| 2019/0381529 | A1* | 12/2019 | Schaumberger | B05B 9/0413 |
| 2020/0130258 | A1 | 4/2020 | Hengl | |
| 2020/0338580 | A1* | 10/2020 | Herget | G05D 1/0212 |
| 2020/0399934 | A1* | 12/2020 | Xu | E05B 73/00 |
| 2022/0063203 | A1* | 3/2022 | Zhou | B33Y 30/00 |
| 2022/0083705 | A1* | 3/2022 | Pinho | E01C 23/163 |

OTHER PUBLICATIONS

Rodrigues, Hugo, et al., “Facing the Challenges in Structural Engineering”, Proceedings of the 1st GeoMEast International Congress and Exhibition, Egypt 2017 on Sustainable Civil Infrastructures, 2018, 5 pgs.

Da Silva, Irineu, et al., “Experience of Using Total Station and GNSS Technologies for Tall Building Construction Monitoring”, Springer International Publishing AG 2018, 16 pgs.

Zheng, Jinchuan, et al,., “Nonlinear Tracking Control for a Hard Disk Drive Dual-Stage Actuator System”, IEEE/ASME Transactions on Mechatronics, vol. 13, No. 5, Oct. 2008, 9 pgs.

Schroeck, Steven J., et al., “On Compensator Design for Linear Time-Invariant Dual-Input Single-Output Systems”, IEEE/ASME Transactions on Mechatronics, vol. 6 No. 1, Mar. 2001, 8 pgs.

Wang, Cong, et al., “Robust Two-Degree-of-Freedom Iterative Learning Control for Flexibility Compensation of Industrial Robot Manipulators”, 2016 IEEE International Conference on Robotics and Automation (ICRA) Stockholm, Sweden, May 16-21, 2016, 6 pgs.

Kobayashi, Masahito, et al., “Track Seek Control for Hard Disk Dual-Stage Servo Systems”, IEEE Transactions on Magnetics, vol. 37, No. 2, Mar. 2001, 6 pgs.

Kim, Byung-Sub, et al., “Two-Parameter Robust Repetitive Control With Application to a Novel Dual-Stage Actuator for Noncircular Machining”, IEEE/ASME Transactions on Mechatronics, vol. 9, No. 4, Dec. 2004, 9 pgs.

Burge, James H., et al., “Use of a commercial laser tracker for optical alignment”, Optical System Alignment and Tolerancing, edited by José M. Sasian, Mitchell C. Ruda, Proc. of SPIE vol. 6676, 66760E, (2007) • 0277-786X/07/$18• doi: 10.1117/12.736705, 12 pgs.

International Search Report and Written Opinion issued for PCT/US23/74591, mailed Dec. 18, 2023, 12 pgs.

International Preliminary Report on Patentability issued for PCT/US23/74591, mailed Apr. 3, 2025, 7 pgs.

* cited by examiner

SYSTEM AND METHOD FOR DUAL STAGE CONTROL OF FIELD PRINTER ROBOT

CROSS-REFERENCE TO RELATED APPLICATIONS

The application claims priority under 35 U.S.C. § 119, to U.S. Provisional Patent Application No. 63/407,978, filed Sep. 19, 2022 and entitled "Dual Stage Control for Field Printer Robot", the entirety of which is hereby incorporated by reference.

TECHNICAL FIELD

The present disclosure is related to controller design for a mobile printing robot, such as for a mobile printing robot to print a building layout on a construction surface.

BACKGROUND

Traditional manual approaches of printing a layout on a construction surface use time consuming and error prone process performed by skilled laborers using chalk lines and tape measures. Mobile printing robots may be used to print construction layouts at construction sites. One of the pioneers of such mobile printing robots is Dusty Robotics, of Mountain View, California. The printing robot created by Dusty Robotics provides faster and more accurate layouts for construction sites compared to manual methods. However, for construction using pre-fabricated walls, the robot must print lines of the layout maintaining sub-millimeter level accuracy while moving at speeds that are typically about 0.5 m/s. This poses a variety of control issues in achieving a challenging specification while also optimizing other performance metrics of a mobile printing robot, such as the time to complete a printing job.

SUMMARY

An improved dual-stage controller is disclosed for a mobile printing robot that reduces, or even eliminates, a deleterious interaction between stages using a decoupling filter. This improves a settling time for accurate line printing and has other advantages.

In one implementation, a mobile printing robot for printing a layout at a construction site, includes a differential drive to move the mobile printing robot; a printing system including a movable print carriage and a linear actuator to move at least one print head laterally with respect to a fore-aft axis of motion of the mobile printing robot; and a dual-stage dual input, single output (DISO) controller having a combined two stage control system to control a pen position in a print mode, including: a first control stage to steer the mobile printing robot and control its speed; a second control stage to control a position of the linear actuator; a pen position associated with an active printer being a sum of the lateral position of the print head relative to a reference point of the robot determined by the steering of the mobile printing robot, the first control stage being a slower control stage than the second control stage; and the controller including a decoupling filter to filter the output of the first control stage by an approximation of the inverse of the second control stage and subtracting the result from a reference input to the control of the second control stage.

In one implementation, the decoupling filter is selected to improve a settling time and convergence to a desired line location.

In one implementation, the decoupling filter is selected to improve a tracking accuracy.

In one implementation, the pen position is estimated from the sum of the measured relative position of the print head to a central origin of the linear actuator and the location of the origin of the linear actuator estimated from the position and orientation of the robot.

In one implementation, the position and orientation of the robot is derived from sensor fusion of position data. In one implementation, the position data includes position data from a laser tracker.

In one implementation, the system has the capability of measuring the movement of the slow first control stage relative to the fast second stage.

In one implementation, the DISO controller comprises a closed-loop control of the fast second stage independently of the slower first stage.

In one implementation, the controller has a top branch representing the closed-loop steering control, associated with the first control stage, for positioning the center of a linear actuator $y_2$, and a bottom branch representing the closed-loop control of $y_1$, a position of the print head relative to the center of the linear actuator associated with the second control stage; wherein the slower $y_2$ stage receives a full reference input r and the faster $y_1$ receives the reference input minus the current position of $y_2$ plus the offset between the line a center or rotation of the robot is to follow and the line to be printed ($r_0$), with the $y_2$ stage settling onto the line r the reference to the $y_1$ loop converges to $r_o$.

In one implementation a dual input, single output (DISO) controller for a mobile printing robot, includes a first control stage to control steering and velocity of a differential drive of the mobile printing robot; a second control stage to control a linear actuator of a movable print head having at least one printer; the first stage being a slower stage than the second stage; the movement of the faster second stage being measured relative to the slower first stage, enable closed loop control of the faster second stage independently of the slower first stage; and a decoupling filter decoupling the dynamics of the first stage and the second stage by filtering an output of the slower first stage by an approximate inverse of the closed-loop dynamics of the faster second stage and subtracting the result from a reference input to the control the second stage.

A method of operating a mobile printing robot, including monitoring a position of the mobile print robot; coordinating a position of a print head position, using a dual-stage controller having a separately controlled linear actuator of a printer carriage and differential steering of a differential drive, including using a decoupling filter to reduce deleterious interactions between a first control stage for the differential drive and a second control stage for the linear actuator configured as a dual input, single output (DISO) controller.

DETAILED DESCRIPTION

Figure 1:
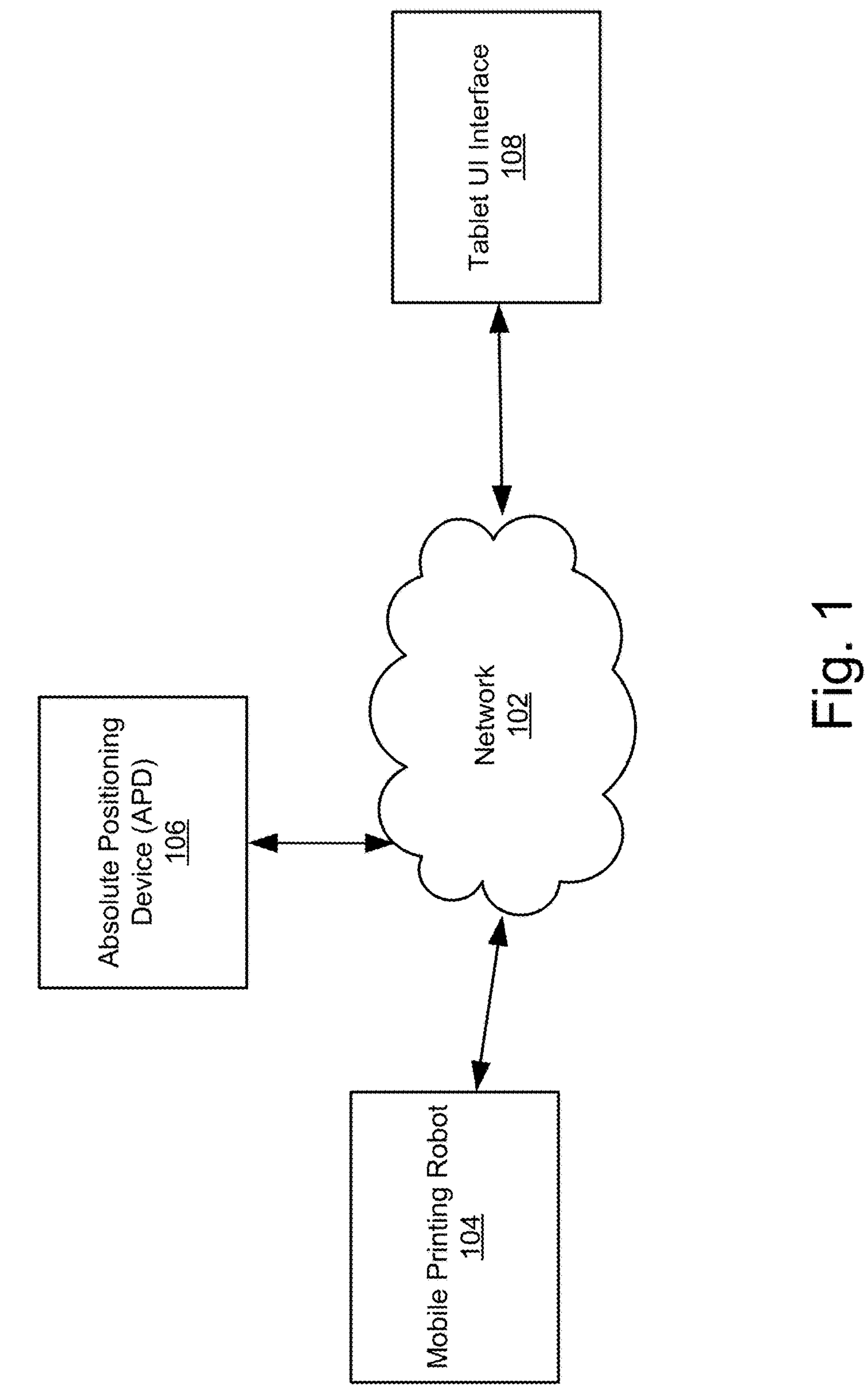
FIG. 1 illustrates a mobile printing robot system in accordance with an implementation.

FIG. 1 is a high-level illustration of a mobile printing robot system 100. A mobile printing robot 104 wirelessly communicates vis a wireless network 102 (e.g., a Bluetooth network), with an absolute positioning device 106 (e.g., a laser tracker). In some implementation, a human agent utilizes a tablet device with a UI interface 108 to perform various tasks, such as instructing the mobile robot to print a layout and displaying the status of a print job.

In one implementation, a controller design for a dual input single output (DISO) system is modified and applied to a mobile printing robot used for printing layouts at construction sites. The mobile printing robot has a differential drive. The mobile printing robot also includes a linear actuator to move a print head in a direction perpendicular to the a fore-aft axis of the mobile printing robot. The linear actuator is separately controlled related to the differential drive. In other words, as the mobile printing robot moves across a construction surface, the linear actuator for the print head can be moved within a linear range of motion, which in turn moves the print head in a range of motion.

Figure 2:
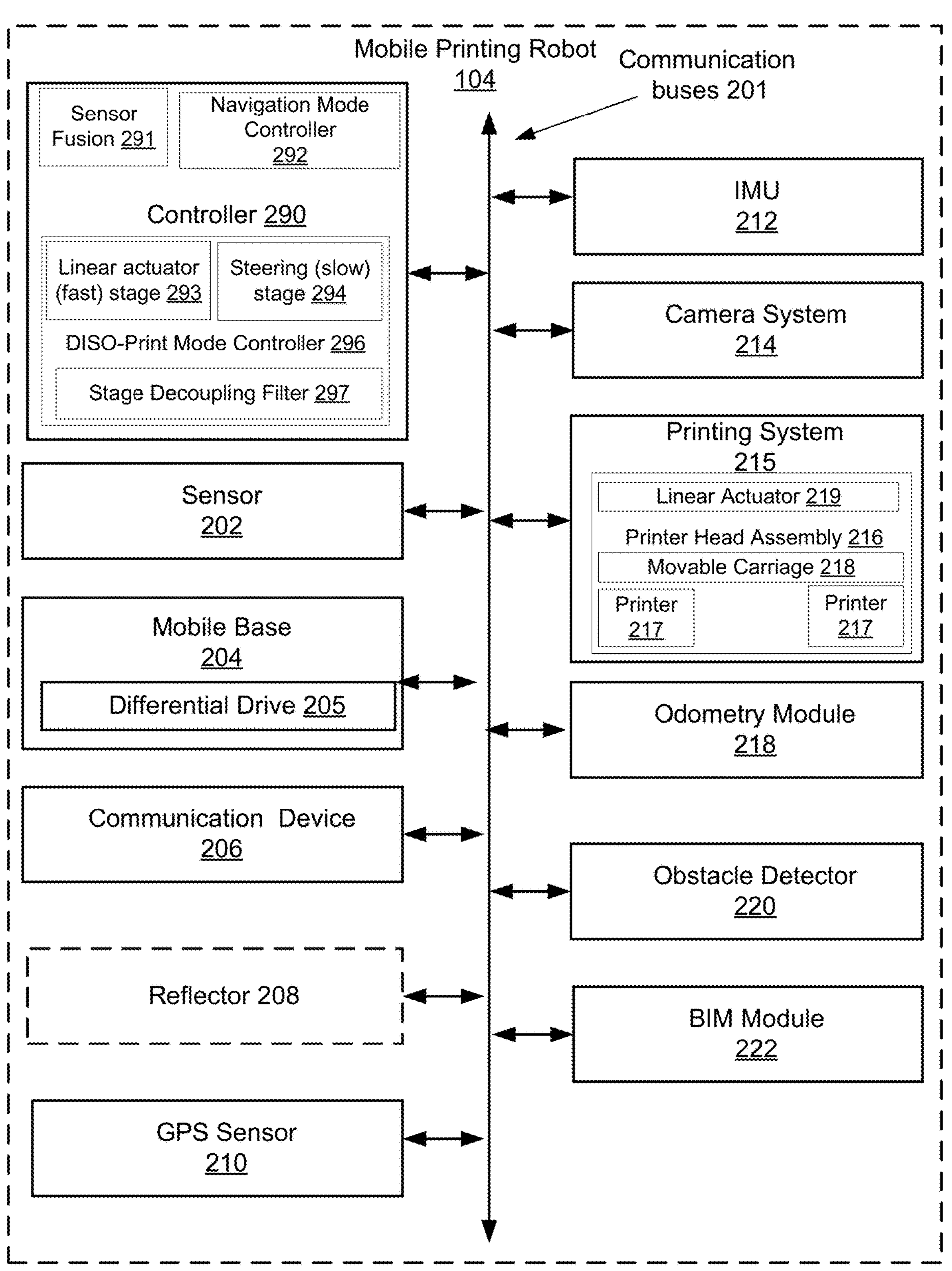
FIG. 2 illustrates an example of functional blocks of a mobile printing robot in accordance with an implementation.

FIG. 2 is a block diagram of some of the major functional blocks of the mobile printing robot, which may, for example, include communication buses 201 to communicate between different functional blocks of the mobile printing robot 104. The mobile printing robot 104 may include various sensors and detectors, such as obstacle detector 220, camera system 214, inertial management unit 212, GPS sensor 210, odometry module 218, and other optional sensors 202. A Building Information Modeling (BIM) module 222 includes information about the layout to be printed. The mobile printing robot includes a differential drive mobile base 204 with a differential drive 205.

A reflector 208 may be part of the mobile printing robot to aid a laser tracker to monitor the position of the mobile printing robot. The reflector 208 may, in some implementations, be rotatable to point at the laser tracker. Alternatively, in some implementations the reflector 208 may be a retroreflector. A communication device 206 is provided for the mobile printing robot to wirelessly communicate with a laser tracker and/or other devices. In one implementation, the printing system 215 includes a print head assembly 216 with at least one printer 217. An active printer printing ink along a line may also, for purposes of discussion, be referred to as a pen. In implementations having two or more printers 217, the printers may be selectively activated. For example, with two printers 217, a selected one of the two printers may be activated at a given time to print a line of a layout. The print head assembly 216 and its printer(s) 217 may have a movable carriage 218 to hold the printer(s) 217 moved by a linear actuator 219 laterally (with respect to a fore-aft direction of motion of the mobile robot) within a range of lateral movement. Each printer 217 may, for example, be an inkjet printer. This ability to move the print head laterally 216 provides greater flexibility in printing than alternatives like fixedly mounting a print head at the center fore-aft axis of the mobile printing robot.

In one implementation, a controller 290 includes a sensor fusion module 291 to fuse position data information. Fusing position data from different sources, such as a laser tracker, an IMU, wheel encoder (and any other source of relevant position data) supports six degrees of freedom (6-DOF) information on mobile robot position, pose, and velocity.

A navigation mode controller 292 performs general navigation of the mobile printing robot in a navigation mode. A dual stage print mode controller 296 is included to control the mobile robot in a print mode. As discussed below in more detail, the controller 296 is a dual input, single output (DISO) controller in which the position of a pen printing a layout line first control stage 294 that controls steering of the differential drive and a second control stage 293 that controls the linear actuator.

The steering control stage 294 is a slow stage in comparison with the linear actuator control stage 293. In a print mode, the printer head position (which can also be described as a pen position) depends on the position and orientation (pose) of the mobile printing robot and the lateral position (on the mobile printing robot) of the print head doing the printing. In one implementation, an additional decoupling filter stage 297 is included to improve the performance of the dual stage control system. In one implementation, the decoupling filter stage 297 has characteristics selection so that the controller 296 achieves fast convergence, a reduced runway distance, and sub-millimeter tracking. Simulations and experimental results demonstrate the effectiveness of the approach.

Figure 3:
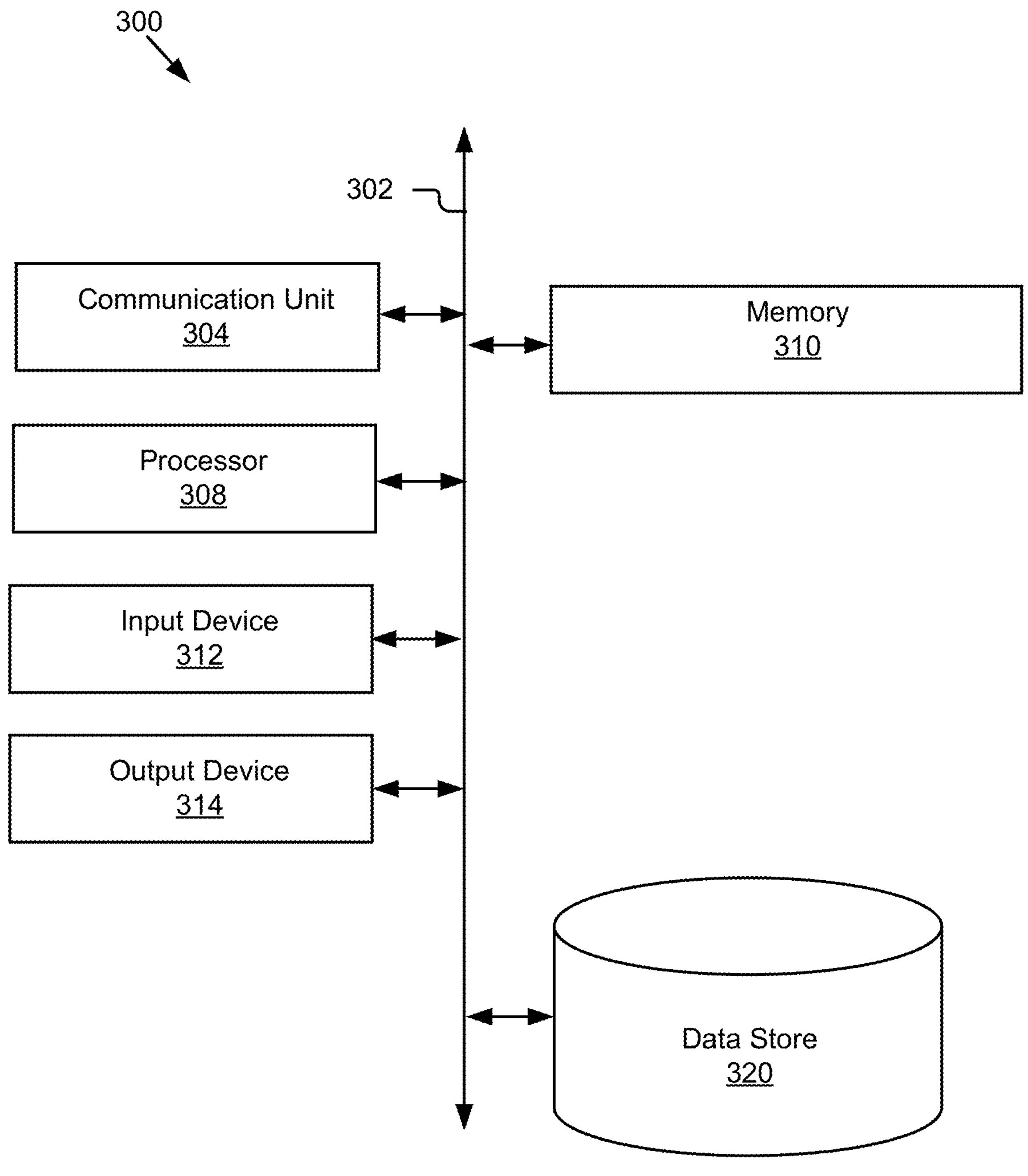
FIG. 3 illustrates a general computer/server architecture for implementing a mobile robot controller in accordance with an implementation.

FIG. 3 illustrates a general computer architecture 300 for implementing the controller 290. The controller may be implemented as computer program instructions stored on a memory 310 and executable in a processor in a subsystem having a communication unit 304, processor 308, input device 312, output device, 314, data store 320, and communication bus 302.

In one implementation, the print head has two inkjet printers (pens) mounted on either side of a translatable linear actuator. Referring to FIG. 4A, a differential drive robot is provided as an illustrative but non-limiting example. It has two independently actuated drive wheels at the front and a caster in the rear (indicated in dashed lines). Two printers 402 are illustrated in a translatable print head. A linear actuator 401 supports lateral translation of the print head. In one implementation, located just forward of the drive wheels are a left print head and a right print head. In one implementation, the linear actuator 401 utilizes a single belt drive to move the printers 402 in tandem laterally relative to the fore-aft axis of the mobile printing robot. This mechanism provides the capability of printing proximate to the edge of the envelope of mobile printing robot. The mechanism may also be implemented to provide the capability of printing outside the envelope of the main body of the mobile printing robot. FIG. 4B illustrates the print head translated to the right. FIG. 4C illustrates the print head translated to the left.

Figure 4:
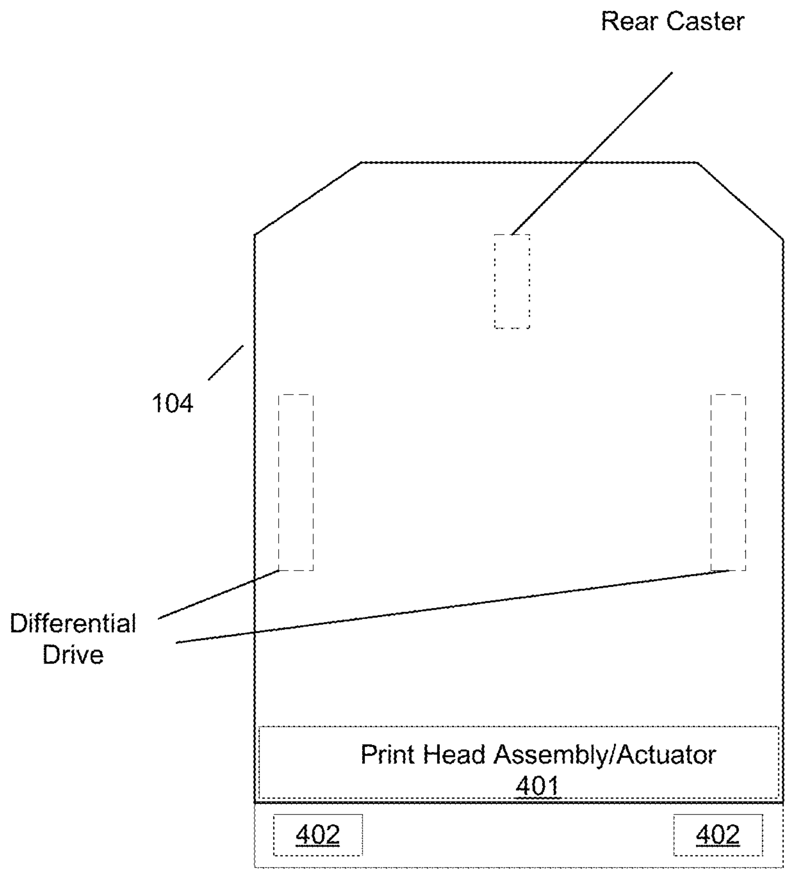
FIG. 4A illustrates a mobile printing robot having a laterally translatable print head in accordance with an implementation.
FIG. 4B the mobile printing robot with the print head moved to the right in accordance with an implementation.
FIG. 4C the mobile printing robot with the print head moved to the left in accordance with an implementation.
FIG. 4D illustrates the mobile printing robot and a range of lateral movement of the print head in accordance with an implementation.
FIG. 4E is a profile view of a mobile printing robot in accordance with an implementation.
Figure 4:
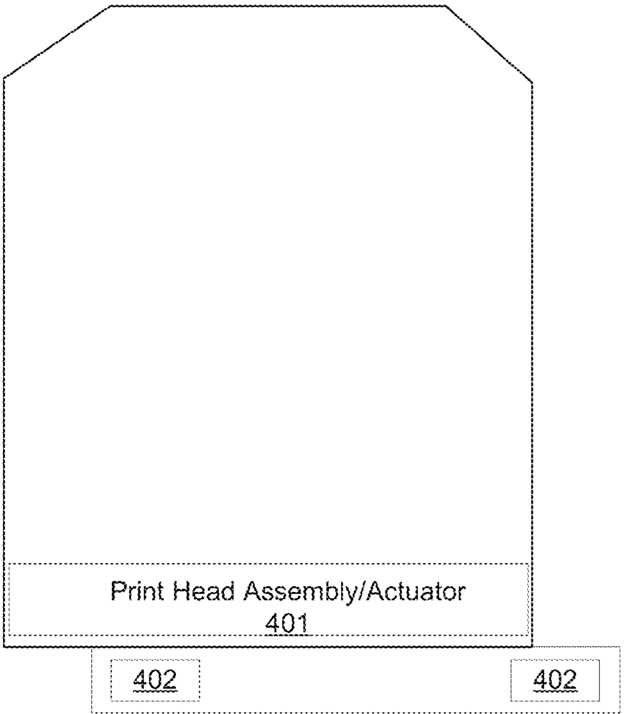
Figure 4:
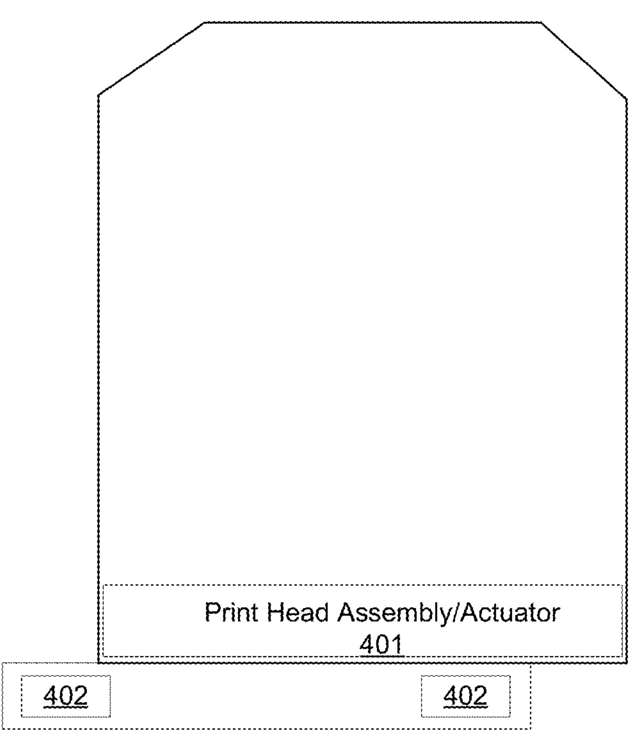
Figures 4D, 4E:
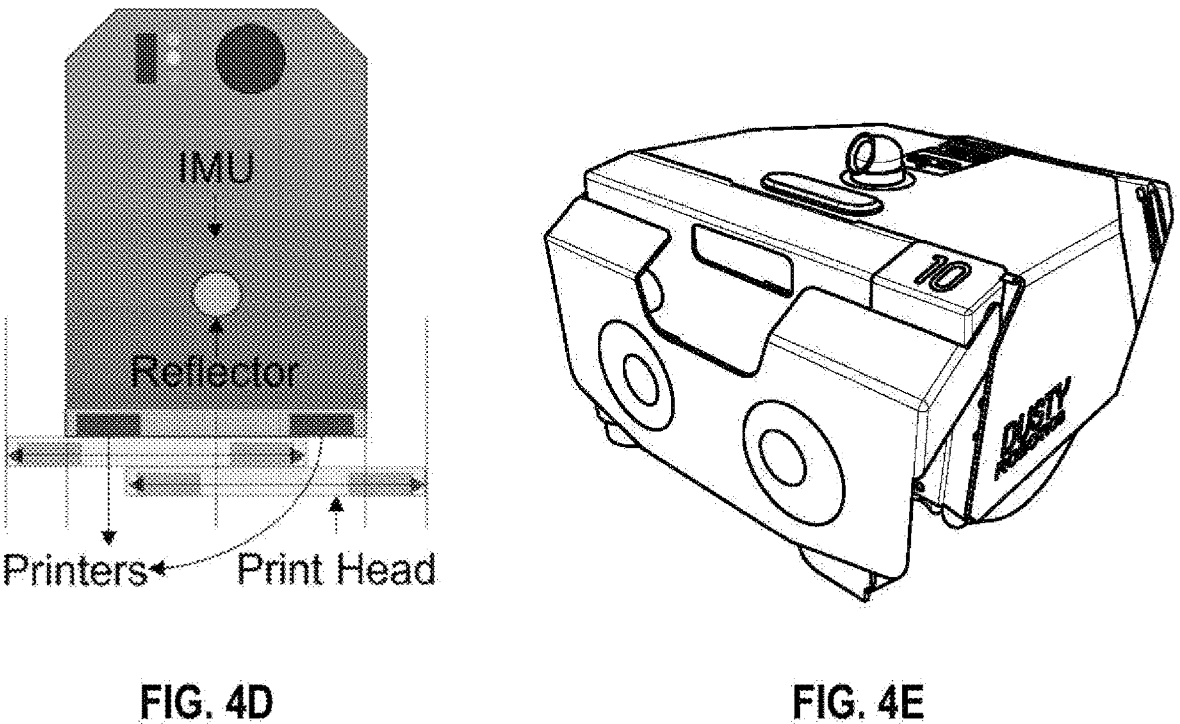

FIG. 4D illustrates a range of movement of the print head. FIG. 4E is a profile view of an example implementation of a mobile printing robot.

Figure 5:
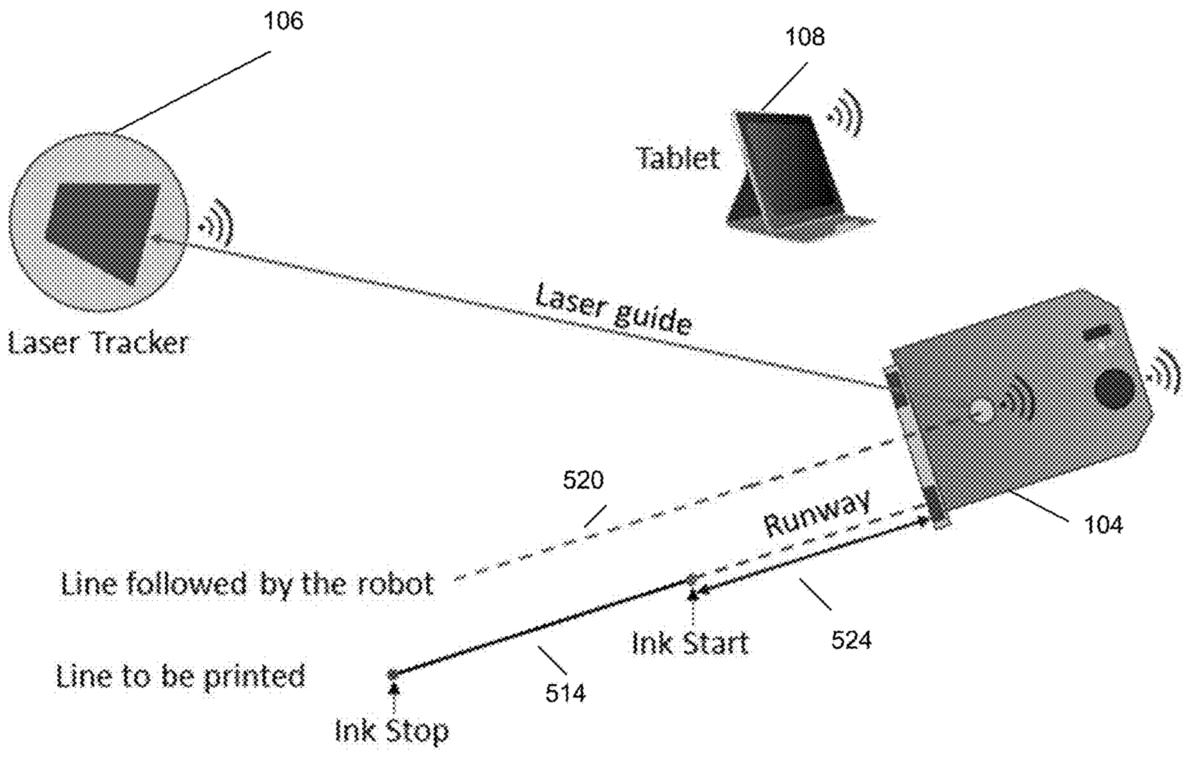
FIG. 5 illustrates aspects of navigation and printing by a mobile printing robot in accordance with an implementation.

FIG. 5 illustrates some aspects of a print mode. The laser tracker is illustrated using a laser beam to track the mobile printing robot and provide absolute position data to the mobile printing robot. The line of motion followed by mobile printing robot is illustrated as line 520, which corresponds to movement along a center fore-aft longitudinal axis of the mobile print robot. However, in a print mode, one of the two printers may be activated to act as a pen. Moreover, its lateral movement may be controlled. There is thus a line to be printed 514 having an ink start point and an ink stop point. There is also a runway 524 in which the mobile printing robot is preparing to print a line. However, part of the reason a runway 524 is required includes control issues related to the time it takes for a control response to settle down.

There are two control stages having a single output in terms of a pen position. The slower stage (which can also be described as the first stage) is the control stage for the differential drive of the robot. The faster stage (which can be described as the second stage) controls the linear actuator. The output, which corresponds to the pen position, is the sum of the lateral position of the center of the linear actuator and the print head position relative to that center.

In one implementation, the output (position of the print head) is not directly measured. Instead, its position is estimated from the sum of the measured relative position of the print head to the origin of the linear actuator and the location of the origin of the linear actuator. The location of the origin of the linear actuator is estimated from the position and orientation of the robot derived from sensor fusion of the available position information from various sources, such as on-board Inertial Measurement Unit (IMU) and an Absolute Positioning Device, such as an off-board Laser Tracker tracking the position the mobile printing robot.

There are several control objectives for printing layouts: (i) reduction of settling time, i.e., fast convergence of an inkjet printer pen to reach a lateral position of the line with minimal overshoot to shorten the required runway, and (ii) following the entire length of a desired printing track with high accuracy tracking, i.e., sub-millimeter level accuracy tracking of the line once converged.

Example Operating Modes and Phases

When consider the primary modes of operation for the mobile printing robot, the mobile printing robot operates in two modes:

1) Navigation Mode—The robot navigates through a series of waypoints to a specific point with a desired orientation. In the navigation mode, millimeter-level accuracy is not required; and
2) Print Mode—The robot follows a straight path and prints lines of a layout on the ground at desired locations with sub-millimeter level accuracy.

The Print Mode includes several phases, including Prepositioning, Approach, and Tracking. In the Prepositioning phase, the robot navigates to a point located n units (where n is a unit of measure, such as a distance in centimeters) behind the Ink Start position at an angle close to the desired print angle. In the Approach phase, the robot adjusts its speed to a specified printing speed (i.e., accelerating or decelerating) and simultaneously steers itself while positioning the print head carriage so that the pen is over the desired line. In the Tracking phase, the pen continues to track the line as the robot travels from the Ink Start to the Ink Stop position at the set print speed.

In the Prepositioning phase, the robot navigates to a position such that the pen is n units behind the Ink Start position to provide a "runway." The runway allows the robot to accelerate to the printing speed and to correct for lateral offsets and heading errors before reaching the Ink Start position. These errors may arise due to imperfect localization and external disturbances during Navigation Mode.

Figure 6:
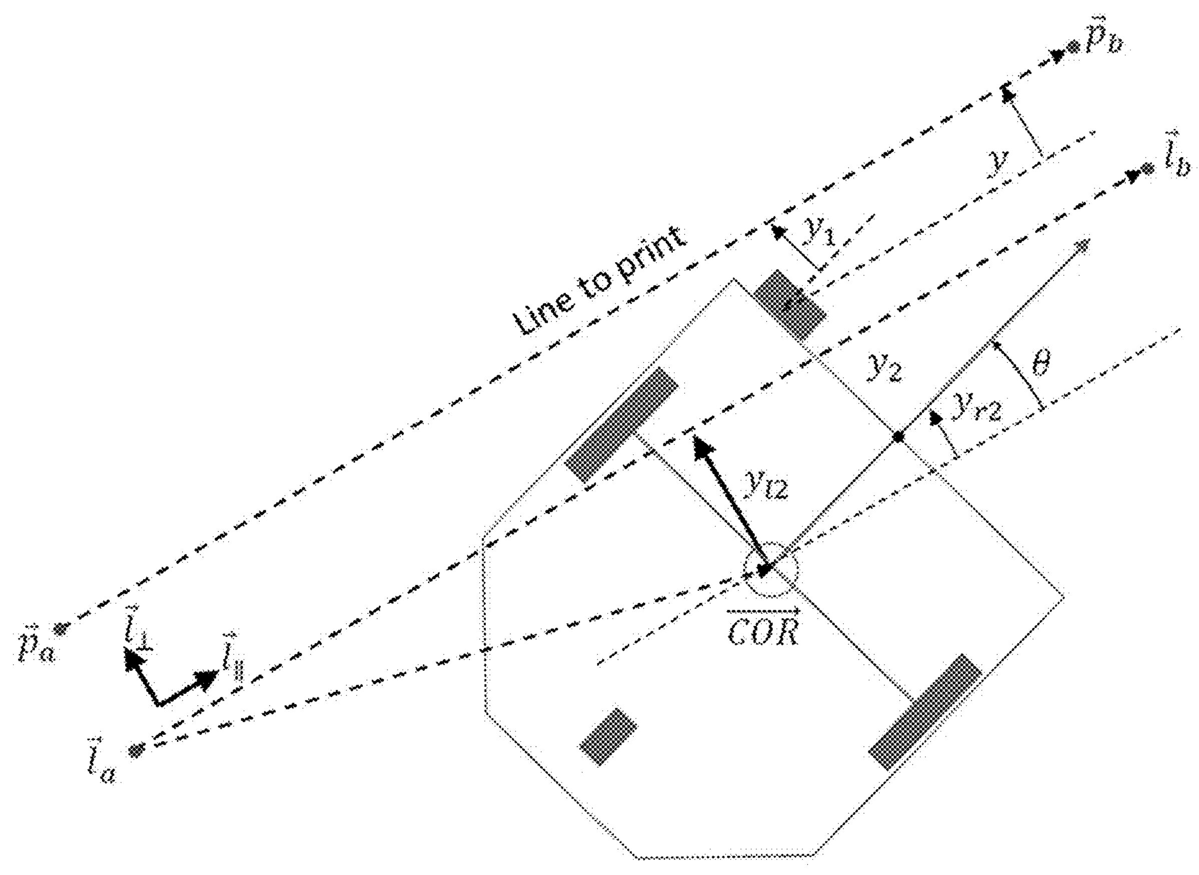
FIG. 6 illustrates the geometry and variables for determining a pen printing position during layout printing in accordance with an implementation.

FIG. 6 illustrates differential drive robot during layout printing. FIG. 6 shows a schematic of the differential drive robot with its linear print stage with only the left print head for clarity. Since the left and right printer positions of the print head assembly are off-center as shown in FIG. 4, the line followed by the robot is translated in the world frame relative to the line to be printed depending on the selected printer and the lateral distance between the location of the origin of the print head to the center of the belt driven linear actuator (a Print Head Center (PHC)).

Variable Definitions

There are a number of different geometric relationships important for understanding the operation of the two-stage controller. The relevant geometry, frames of references, and associated variable definitions are illustrated in regard to FIG. 6:

$y$: print head lateral position (world frame)
$\theta$: angle between line and robot heading
$y_{l2}$: distance between the center of rotation (COR) and line to follow
$y_{r2}$: lateral deviation of PHC from COR due to $\theta$ (robot frame)
$y_2$ ($\triangleq y_{PHC}$): center of linear actuator (world frame)
$y_1$: pen position with respect to PHC (robot frame)

The vectors $\vec{p}_a$ and $\vec{p}_b$ are the start and end points of the line segment to be printed, and $\vec{l}_a$ and $\vec{l}_b$ are the start and end of the line segment followed by the robot. $\vec{l}_=$ and $\vec{l}_\perp$ represent the orthogonal unit vectors that are parallel and perpendicular to the line segment $\vec{l}_{ba} \triangleq \vec{l}_b - \vec{l}_a$ respectively. COR is the vector from the start to the center of rotation. Thus, θ is the angle of the robot heading relative to $\vec{l}_{ba}$. The distance between the center of rotation to the print head center (see FIG. 6) is b. Therefore, the relations for $y_{l2}$, $y_{r2}$, and $y_{PHC}$ assuming small angle approximations are:

$$y_{l2}(t) = \vec{l}_\perp \cdot \overrightarrow{COR}(t) \quad \text{Eq. 1}$$

$$y_{r2}(t) = b\theta \quad \text{Eq. 2}$$

$$y_{PHC} \triangleq y_2 = y_{l2} + y_{r2} \quad \text{Eq. 3}$$

Controller Objectives

As previously discussed, there are two primary control objectives. The first is to reduce the settling time for the inkjet (pen) to reach the lateral position of the line to shorten the required runway. The second is to follow the entire length of the desired print track with sub-millimeter accuracy.

An aspect of the mobile printer robot is that it has the capability of measuring the movement of the fast stage relative to the slow stage. This property enables closed-loop control of the fast stage independently of the slower stage. As will be shown, a new controller approach enables the DISO system to respond as if it consisted of the closed-loop controlled fast controller stage alone.

Another important aspect is that the position of the center of the linear actuator $y_2$ is estimated using the position $y_{l2}$ of the center of rotation $\overrightarrow{COR}$ and the orientation of the robot θ, both measured with the Laser Tracker. These measurements enable closed-loop control of the slow stage independently of the fast stage. With the measured position of the pen relative to the center of the linear actuator ($y_1$), these measurements are sufficient to achieve decoupling using a decoupling filter. The decoupling filter improved performance by reducing (and in some cases largely or even completely eliminating) deleterious interactions between the control stages that reduces performance.

Problems with Prior Dual Stage Controller Design

Figure 7:
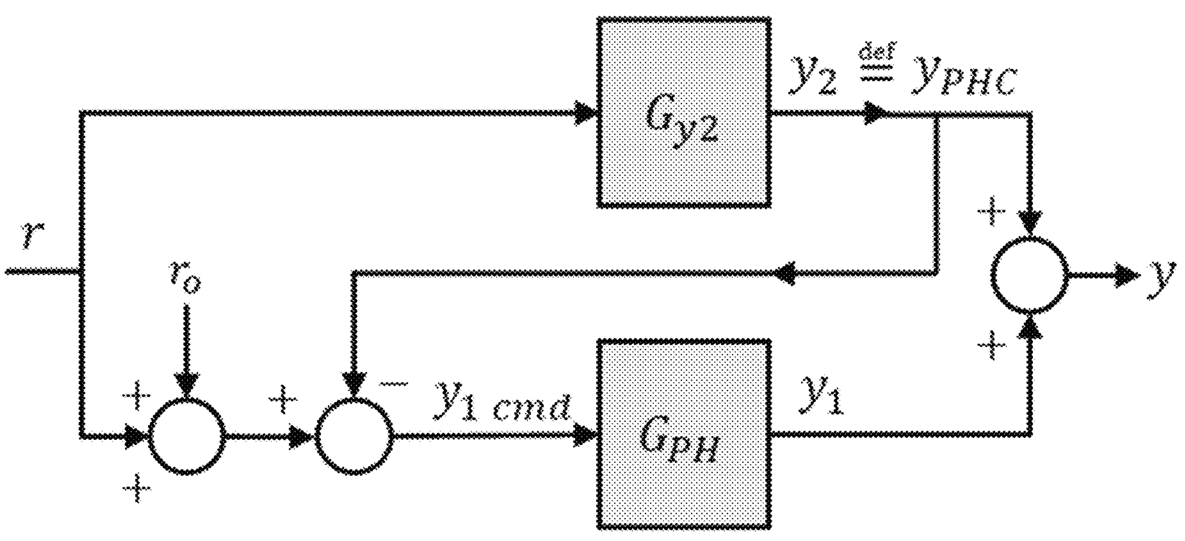
FIG. 7 is a block diagram of a two-stage system for pen position control (in which "cmd" stands for command) in accordance with an implementation.

Prior two-stage controllers for mobile printing robots suffered from a variety of problems. FIG. 7 shows the block diagram of a previous generation of two-stage print head positioning system for pen position command in which "cmd" stands for command. The top branch represents the closed-loop steering control for positioning the center of the linear actuator $y_2$, and the bottom branch represents the closed-loop control of $y_1$, the print head relative to the center of the linear actuator. The slower $y_2$ stage receives the full reference input r. The faster $y_1$ receives the reference input minus the current position of $y_2$ plus the offset between the line the COR is to follow and the line to be printed ($r_o$). As the $y_2$ stage settles onto the line r the reference to the $y_1$ loop converges to $r_o$.

Steering Control

Figure 8:
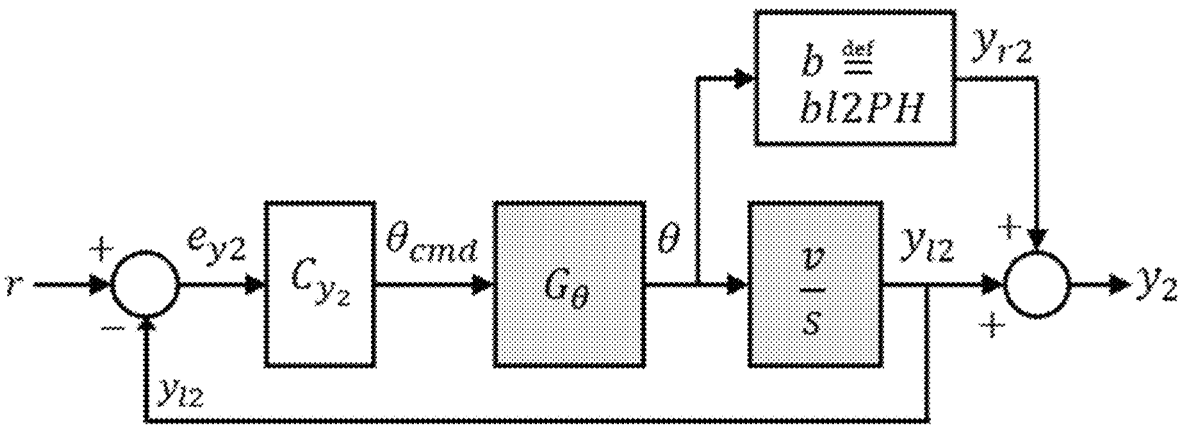
FIG. 8 is a block diagram of closed-loop steering control ($G_{y_2}$) in accordance with an implementation.

FIG. 8 depicts the block diagram of the closed-loop control of $y_2$. With the assumption that θ is small, the lateral velocity of the COR, $\dot{y}_{l2}$, is the product of the (constant) forward velocity v, and θ. Thus, $$y_{l2} = \frac{v}{s}\theta.$$

Applying Eqns. 2 and 3 gives, $$y_2 = \left((b/v)s + 1\right)y_{l2} \quad \text{Eq. 4}$$

Figure 9:
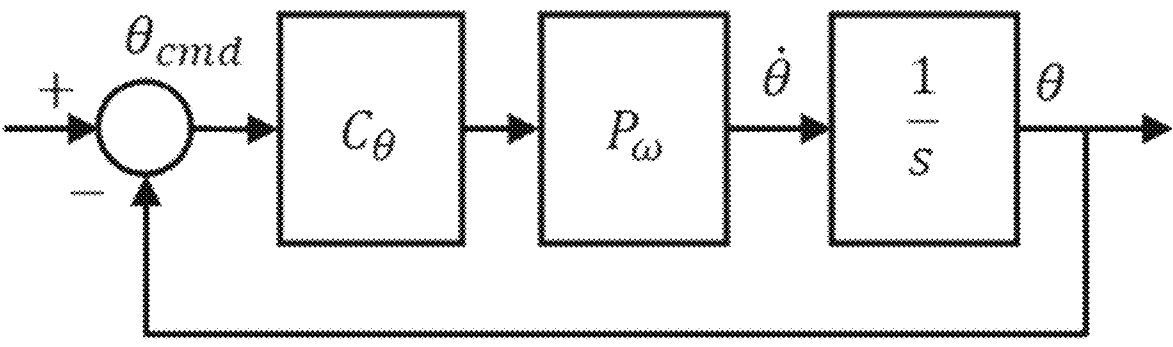
FIG. 9 is a block diagram of closed-loop heading control ($G_\theta$) in accordance with an implementation.

Reducing the inner loop of the block diagram gives the closed-loop transfer function from r to $y_{l2}$, $$G_{y_{l2}} = \frac{\frac{v}{s}G_\theta C_{y_2}}{1 + \frac{v}{s}G_\theta C_{y_2}} \quad \text{Eq. 5}$$

which leads to the transfer function from r to $y_2$, $$G_{y_2} \triangleq \left((b/v)s + 1\right)G_{y_{l2}}(s) \quad \text{Eq. 6}$$

where the block $G_\theta$ represents the inner control loop for the heading depicted in FIG. 9. Block diagram reduction gives the transfer function from $\theta_{cmd}$ to θ.

$$G_\theta = \frac{\frac{1}{s}C_\theta P_\omega}{1 + \frac{1}{s}C_\theta P_\omega} \quad \text{Eq. 7}$$

The form of $P_\omega$ used for controller design is $$P_\omega = KDC_\omega \frac{\omega_{n_\omega}^2}{s^2 + 2\zeta_\omega \omega_{n_\omega} + \omega_{n_\omega}^2} \quad \text{Eq. 8}$$

In one implementation, the inner-loop controller is the proportional derivative (PD) controller $C_\theta = Kd_\theta s + Kp_\theta$. The proportional gain ($Kp_\theta$) and the derivative gain ($Kd_\theta$) are chosen such that closed-loop heading control $G_\theta$ exhibits approximately critically damped dynamics with no overshoot and 2% settling time of less than 0.6 s for a step input. The DC gain of $G_\theta$ is 1 because of the integration of $\dot{\theta}$ to θ.

Figure 10:
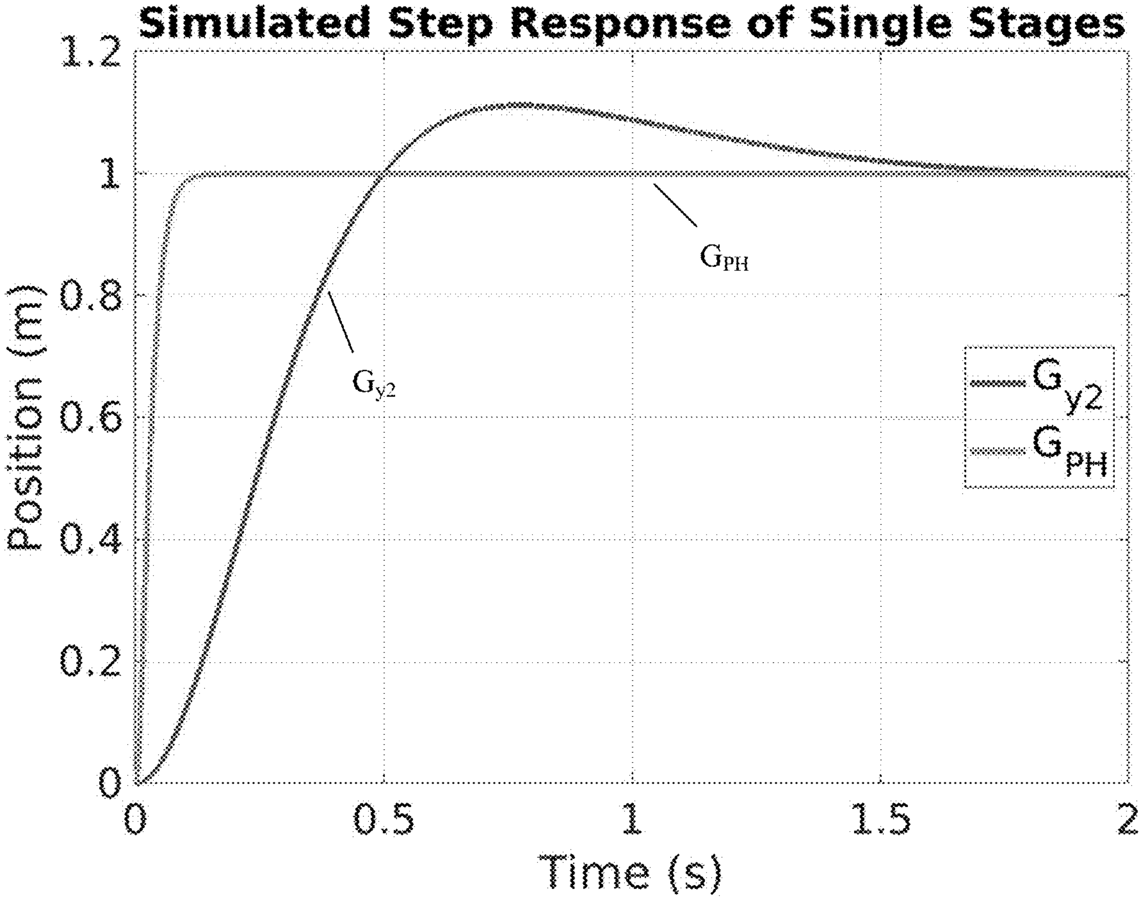
FIG. 10 illustrates a comparison of simple simulated step responses of single stages in accordance with an implementation.

In one implementation the outer loop controller $C_{y_2}$ is a proportional controller with the gain chosen such that $G_{y_2}$ exhibits about 11% overshoot and a 2% settling time of about 1.5 s. The integration of $\dot{y}_{l2}$ to $y_{l2}$ means that the DC gain of the closed-loop $G_{y_{l2}}$ is 1. That property and Eqn. 4 imply that DC gain of $G_{y_2}$ also is 1. FIG. 10 shows the step responses of $G_{y_2}$ and $G_{PH}$.

Linear Stage Control

Figure 11:
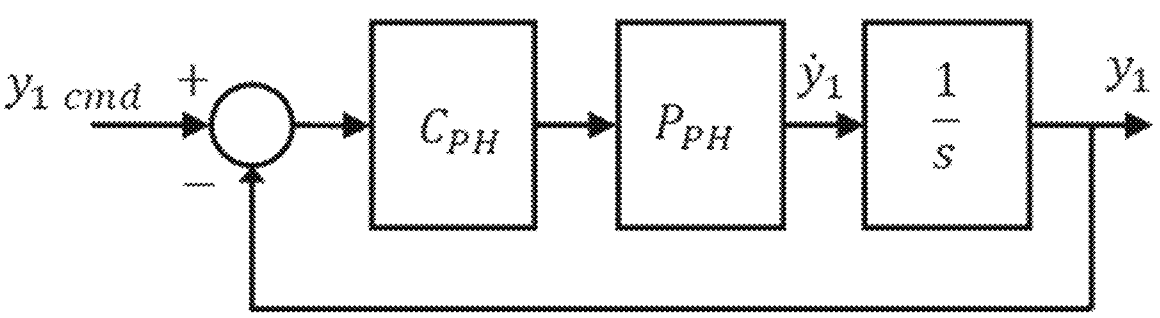
FIG. 11 illustrates a block diagram of closed-loop linear stage control ($G_{PH}$) in accordance with an implementation.

FIG. 11 depicts the block diagram of the closed-loop control of $y_1$ leading to $$G_{PH} = \frac{\frac{1}{s}C_{PH}P_{PH}}{1 + \frac{1}{s}C_{PH}P_{PH}}$$

The identified form of $P_{PH}$ is $$P_{PH} = KDC_{PH}\frac{ab}{(s+a)(s+b)}$$

where a and b may be optimized for a particular mobile printing robot implementation.

The linear stage controller is the PD controller $C_{PH}=Kd_{PH}s+Kp_{PH}$. The proportional gain ($Kp_{PH}$) and the derivative ($Kd_{PH}$) are chosen such that the closed-loop $G_{PH}$ exhibits approximately critically damped behavior with no overshoot for a step input and 2% settling time of about 0.1 s. The DC gain of the closed-loop is 1 for a step reference input because of the integration of $\dot{y}_1$ to $y_1$. FIG. 10 shows the step response of $G_{PH}$.

Combined Two Stage System

Using $y_2=G_{y_2}r$ and $y_1=G_{PH}$, FIG. 7 implies $$y=y_2+y_1=G_{y_2}r+G_{PH}(r+r_o-y_2)$$

For ease of analysis, assume that $r_o=0$. Then, $$y=(G_{y_2}+G_{PH}-G_{PH}G_{y_2})r=G_{SISO\text{-}ND}r$$

where ND indicates "no decoupling."

Figure 12:
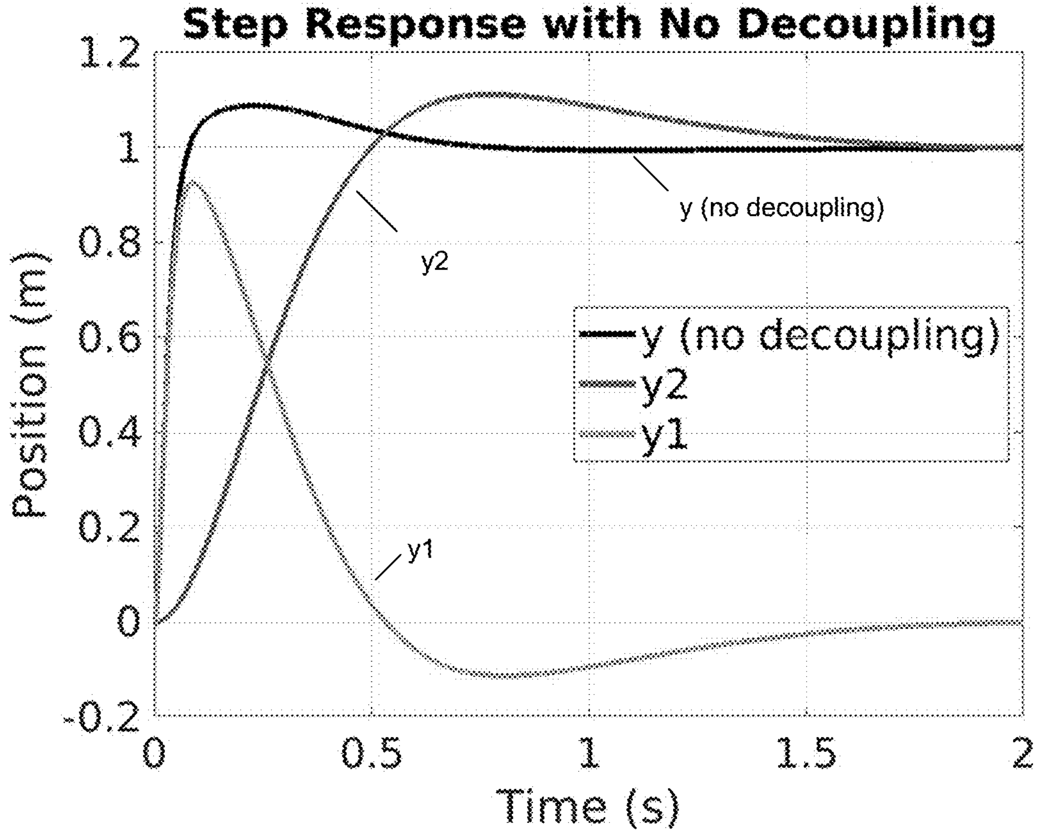
FIG. 12 illustrates a simulated response for dual stage system of FIG. 4 showing output y and signals $y_2$ and $y_1$ in accordance with an implementation.

FIG. 12 shows the step response of $G_{SISO\text{-}ND}$ and the signals $y_2$ and $y_1$. The substantial overshoot and the settling time being many times longer than the settling time of $G_{PH}$ suggests that better performance is possible.

Two Stage Controller with Decoupling Filter to Improve Performance

Figure 13:
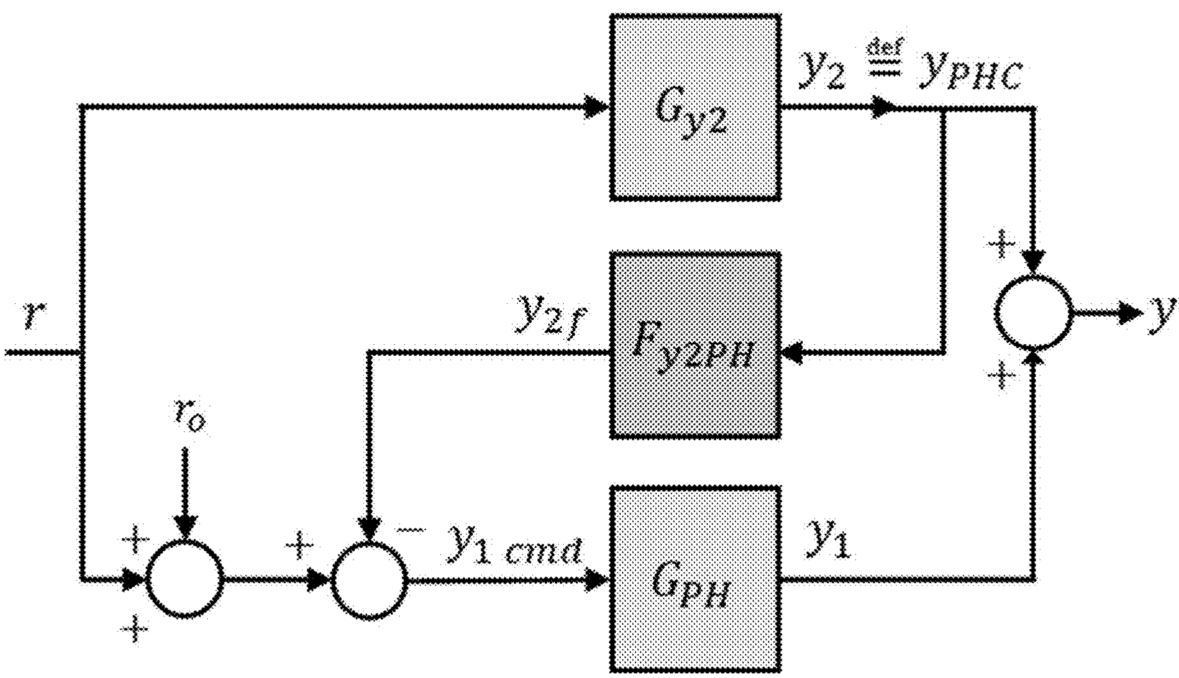
FIG. 13 illustrates a two-stage control architecture with a decoupling filter in accordance with an implementation.

A two-stage control architecture with a decoupling filter is illustrated in FIG. 13. FIG. 13 shows the modified controller structure where $F_{y_2PH}$ is the filter that decouples the dynamics of $G_{y_2}$ and $G_{PH}$.

Again, assuming that $r_o=0$, FIG. 13 implies $$\begin{aligned} y &= G_{y_2}r + G_{PH}(r - F_{y_2PH}y_2) \\ &= ((1 - F_{y_2PH}G_{PH})G_{y_2} + G_{PH})r \\ &= G_{SISO-D}r \end{aligned}$$

The key insight is that if $$F_{y_2PH} \approx G_{PH}^{-1},$$

then $1-F_{y_2PH}G_{PH}\approx 0$ and $G_{SISO\text{-}D}\approx G_{PH}$. That is, the output response will be essentially that of the fast stage. Note that to achieve a benefit in operation of the mobile printing robot that the condition $$F_{y_2PH} \approx G_{PH}^{-1}$$

only needs to be met approximately, not exactly. For the purposes of explaining principles of operation, it is assumed that a close approximation is achieved, although in terms of real-world behavior of a mobile printing robot the approximation only needs to be close enough to improve the performance of the mobile printing robot.

Figure 14:
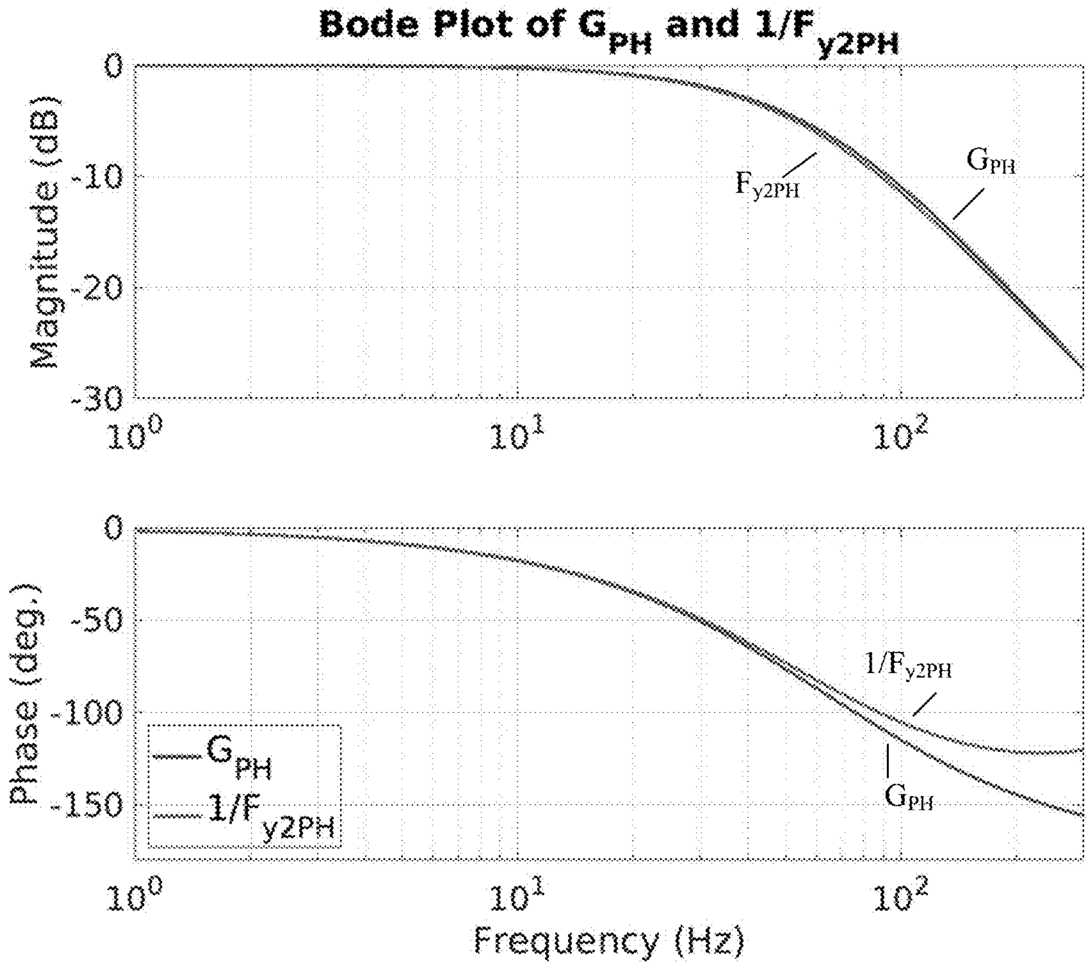
FIG. 14 illustrates a Bode plot of $G_{PH}$ and inverse of decoupling filter $F_{y_2PH}$

To create a realizable approximation to $$G_{PH}^{-1}$$

we fit the transfer function $$F_{y_2PH}^{-1} = \left(\frac{p}{z}\right)^2 \frac{(s+z)^2}{(s+p)^2}$$

to the Bode plot of $G_{PH}$ of FIG. 14. The parameters of the fit are z=60 and p=900.

Figure 15:
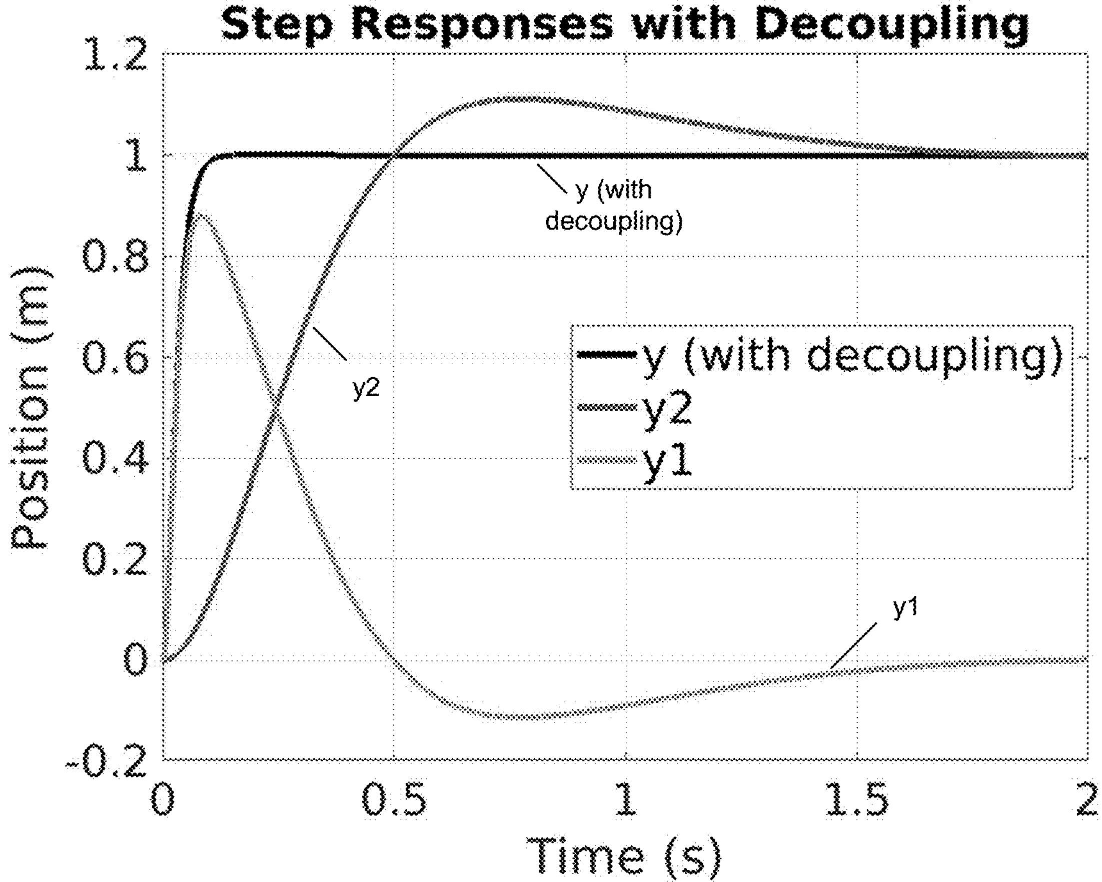
FIG. 15 illustrates a simulated response for dual stage system with decoupling filter showing output y and signals $y_2$ and $y_1$ in accordance with an implementation.

FIG. 15 shows a simulation of the step response using this decoupling filter and the responses of the signals $y_2$ and $y_1$. Note that the output y is essentially the same as the step response of $G_{PH}$ while signal $y_2$ is unchanged from the step response of $G_{y2}$ in FIG. 10, as the steering is unaffected by the decoupling filter.

Figure 16:
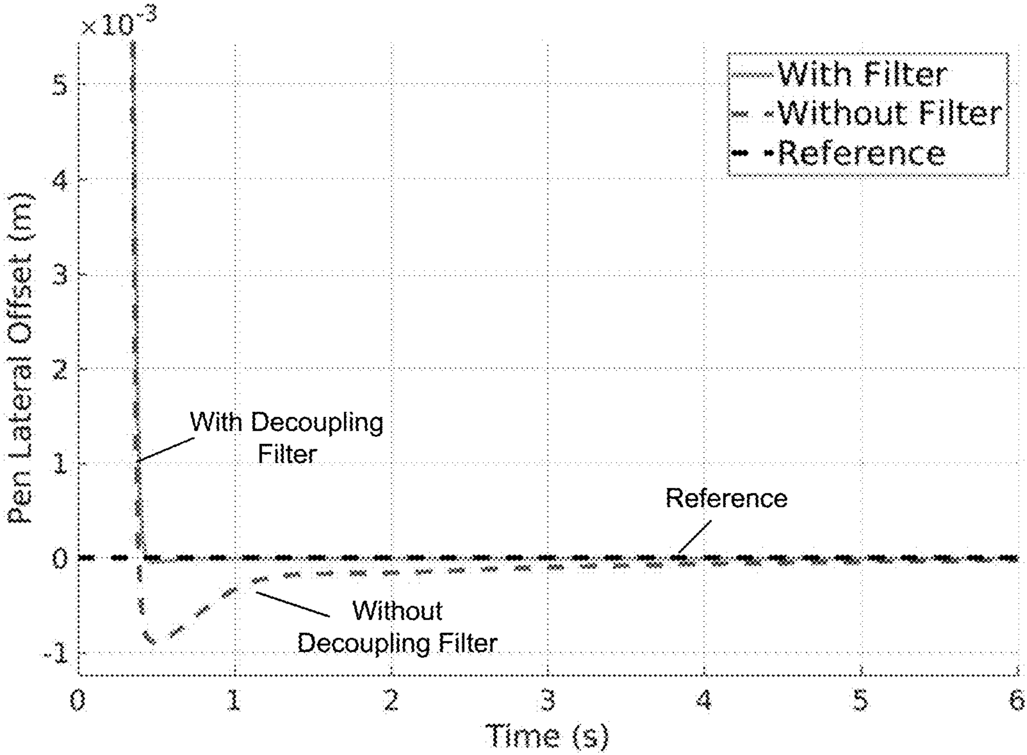
FIG. 16 illustrates Pen location with and without the decoupling filter in accordance with an implementation.

FIG. 16 shows the results for the simulation of the lateral pen position y versus the time of the total system. The initial conditions for the simulation were $\theta(0)\approx 2°$, $y_2(0)\approx 3$ cm, and $y_1(0)\approx 1.73$ cm. The system employing the decoupling filter $F_{y_2PH}$ converges with almost zero overshoot to within 0.15 mm of the desired position about 1.5 seconds faster than the system without the filter. Reducing the convergence time by 1.5 seconds enabled a significant reduction of the runway while improving the print quality and thus, decreasing overall print time substantially.

Experimental Results

To demonstrate the effectiveness of the control method, experiments were conducted. The forward velocity in the experiments was v=0.5 m/s. A convergent comparison was performed to compare convergence of the print head to a desired line. A robot printed two pairs of 5 m long parallel lines with blue ink. The robot printed one pair using the previous generation of dual stage controller (without a decoupling filter) and the other with the new controller (with a decoupling filter). Then the robot attempted to print on top of the same lines in black ink starting at the halfway point of the 5 m blue lines.

Figure 17:
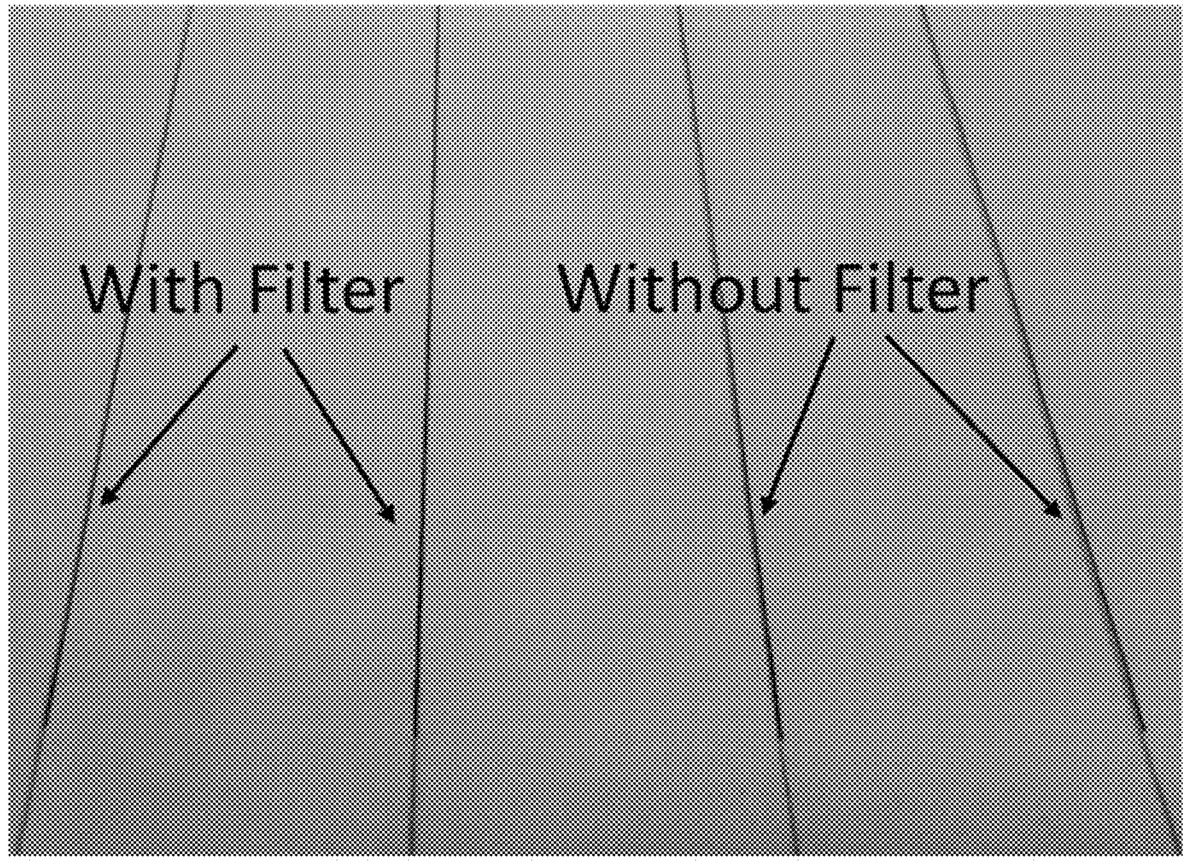
FIG. 17 is a photo comparing convergence for controllers with and without a decoupling filter in accordance with an implementation.
Figure 18:
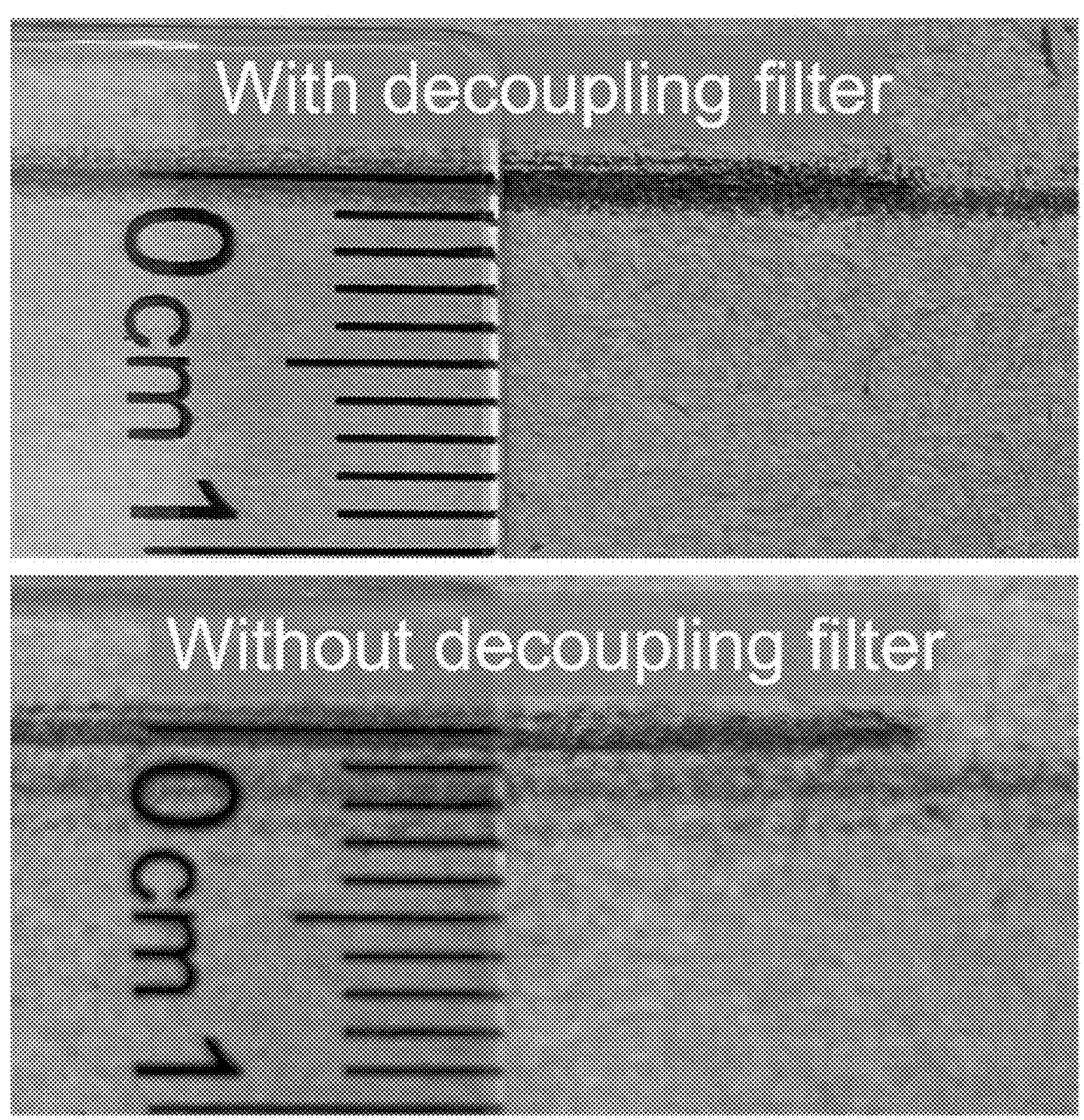
FIG. 18 is a close-up photo for the same experiment as in FIG. 17, showing a comparison of convergence with and without a decoupling filter in accordance with an implementation.

The right side of FIG. 17 shows how close the black lines are to the blue lines at the start of printing. FIG. 18 is a close up view showing the rapidity of convergence. With the prior controller (without a decoupling filter), the separation is approximately 1.5 mm center to center with a 0.5-1 mm gap between lines, and the separation persists for about 30 cm. In contrast, using the new method using a decoupling filter, the black line almost completely overlays the blue reference. The center-to-center separation is less than 0.5 mm, there is no gap, and the separation becomes undetectable in just a couple of centimeters.

Figure 19:
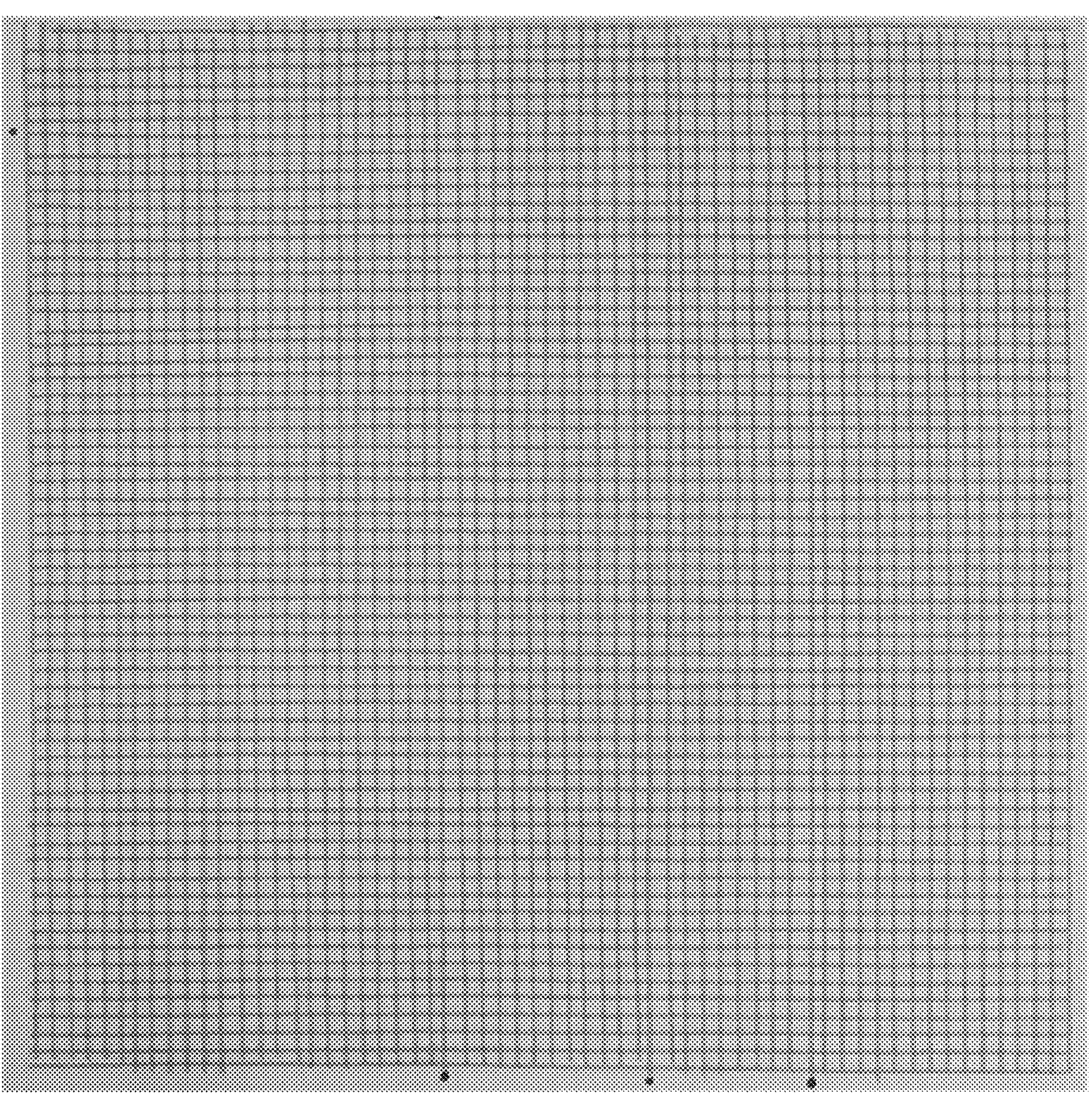
FIG. 19 shows a grid printed without a decoupling filter in accordance with an implementation.
Figure 20:
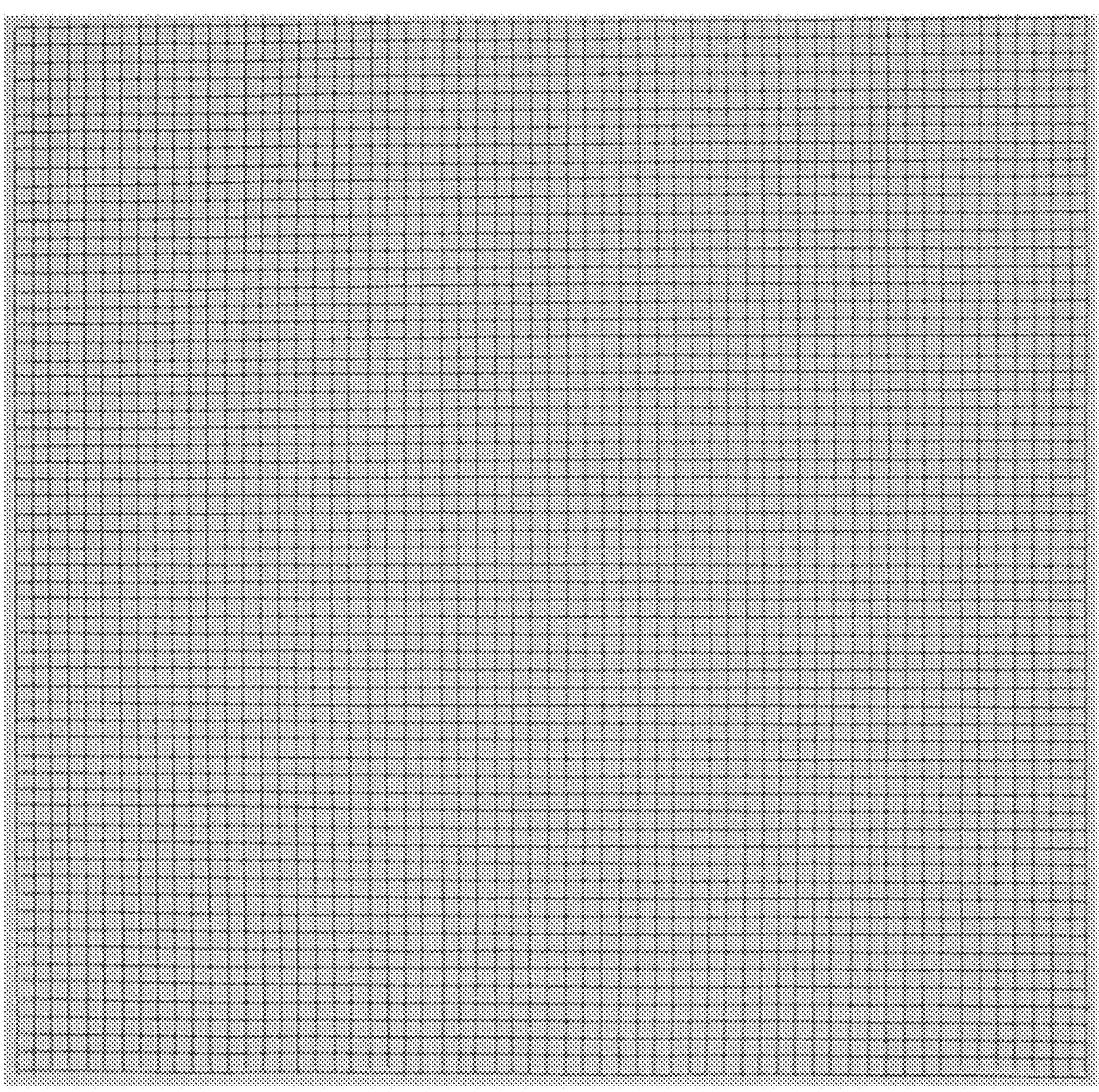
FIG. 20 shows a grid printed with a decoupling filter in accordance with an implementation.

Experiment 2 compared the overall print quality by creating two 30 cm×30 cm grids with 5 mm spacing. Visual inspection of FIG. 19 (no decoupling filter) and FIG. 20 (with a decoupling filter) reveal significantly less variation in the grid when using the new controller. The largest variability between consecutive grid lines decreased from over ±2 mm to less than ±1 mm overall. The black dots of FIG. 19 indicate lines with particularly large errors. FIG. 20 shows more consistent grid spacing.

In summary a dual-stage control method for a field printer robot decouples the dynamics of the two stages by filtering the output of the slower differential steering stage by the approximate inverse of the closed-loop dynamics of the faster linear actuator stage and then subtracting the result from the reference input to the control of the linear actuator.

Simulations and experiments show the method achieves significantly faster convergence to desired line locations and maintains significantly higher tracking accuracy compared to the approach in prior use.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes, but is not limited to, firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MIMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

What is claimed is:

1. A system, comprising:

a mobile printing robot having a dual-stage Dual Input Single Output (DISO) controller that includes a decoupling filter to decouple deleterious dynamics between two control stages that act in combination to control a pen position of the mobile printing robot, the two control stages including a differential steering stage to control a differential drive of the mobile printing robot to steer the mobile printing robot and control its speed, and a linear actuator stage controlling a lateral position of a printer of a printhead relative to a reference point of the mobile printing robot, in which the printer, when activated in a print mode, acts as a pen for printing lines of a layout on a construction surface;

the differential steering stage being a slower stage than the linear actuator stage;

and the decoupling filter configured for filtering an output of the differential steering stage by an approximate inverse of closed-loop dynamics of the linear actuator stage and then subtracting the result from a reference input to the linear actuator stage such that the decoupling filter causes the dual-stage DISO controller to approximate the closed-loop dynamics of the linear actuator stage.

2. The system of claim 1, wherein the decoupling filter reduces a settling time.

3. The system of claim 1, wherein the decoupling filter reduces a runway for the mobile printing robot to accurately track a line in a print mode.

4. The system of claim 1, wherein the decoupling filter improves a printing position accuracy.

5. The system of claim 1, wherein a-position of the pen is estimated from a sum of the measured relative position of the print head to a central origin of a linear actuator and the location of the origin of the linear actuator is estimated from the position and orientation of the mobile printing robot.

6. The system of claim 1, wherein the position and orientation of the mobile printing robot is derived from sensor fusion of position data.

7. The system of claim 6 wherein the position data includes position data from a laser tracker.

8. The system of claim 1, wherein the system has the capability of measuring movement of the differential steering stage relative to the linear actuator stage.

9. A system, comprising:

a mobile printing robot configured to print a layout at a construction site;

a differential drive to move the mobile printing robot;

a printing system including a movable print carriage and a linear actuator to move a print head, having at least one printer, laterally with respect to a fore-aft axis of motion of the mobile printing robot; and a dual-stage dual input, single output (DISO) controller of the mobile printing robot having a combined two stage control system to control a pen position in a print mode associated with a selected printer, including:

1) a first control stage to control steering of the mobile printing robot and control its velocity;

2) a second control stage to control a position of the linear actuator;

a pen position associated with an active printer being a sum of the lateral position of the print head relative to a reference point of the robot determined by the steering of the mobile printing robot, the first control stage being a slower control stage than the second control stage; and the controller including a decoupling filter to filter the output of the first control stage by an approximation of the inverse of the second control stage and subtracting the result from a reference input to the second control stage such that the decoupling filter causes the combined two-stage control system to approximate closed-loop dynamics of the second control stage.

10. The system of claim 9, wherein the decoupling filter is selected to improve a settling time and convergence to a desired line location.

11. The system of claim 9, wherein the decoupling filter is selected to improve a tracking accuracy.

12. The system of claim 9, wherein the pen position is estimated from the sum of the measured relative position of the print head to a central origin of the linear actuator and the location of the origin of the linear actuator estimated from the position and orientation of the mobile printing robot.

13. The system of claim 9, wherein the position and orientation of the mobile printing robot is derived from sensor fusion of position data.

14. The system of claim 13 wherein the position data includes position data from a laser tracker.

15. The system of claim 9, wherein the system measures movement of the first control stage relative to the second control stage.

16. The system of claim 14, wherein the DISO controller comprises a closed-loop control of the second stage independently of the first stage.

17. The system of claim 9, wherein the DISO controller has a top branch representing the closed-loop steering control, associated with the first control stage, for positioning the center of a linear actuator $y_2$, and a bottom branch representing the closed-loop control of $y_1$, a position of the print head relative to the center of the linear actuator associated with the second control stage; and wherein the slower $y_2$ stage receives a full reference input r and the faster $y_1$ receives the reference input minus the current position of $y_2$ plus the offset between the line a center of rotation of the mobile printing robot is to follow and the line to be printed ($r_o$), with the $y_2$ stage settling onto the line r the reference to the $y_1$ loop converges to $r_o$.

18. A dual input, single output (DISO) controller for a mobile printing robot, comprising:

a first control stage to control steering and velocity of a differential drive of the mobile printing robot;

a second control stage to control a linear actuator, to control lateral movement with respect to a fore-aft axis, of a movable print head having at least one printer to print a layout on a construction surface;

the first control stage being a slower stage than the second control stage;

movement of the faster second control stage being measured relative to the first control stage, enable closed loop control of the second control stage independently of the slower first control stage; and a decoupling filter decoupling the dynamics of the first control stage and the second control stage by filtering an output of the first control stage by an approximate inverse of the closed-loop dynamics of the second control stage and subtracting the result from a reference input to the control the second control stage.

19. A method of operating a mobile printing robot, comprising:

monitoring a position of the mobile printing robot;

in a print mode, coordinating a position of a printer of a print head, using a dual-stage dual input, single output (DISO) controller having a first control stage to control differential steering of a differential drive of the mobile printing robot and a second control stage to control a linear actuator used to control a lateral position of a movable print head of the mobile printing robot with respect to a fore-aft axis;

using a decoupling filter to reduce deleterious interactions between the first control stage and the second control stage; and in a print mode, performing at least one phase of a printing process for a line of a construction layout.

* * * * *